United States Patent [19]

Adams

[11] Patent Number: 5,177,342
[45] Date of Patent: Jan. 5, 1993

[54] TRANSACTION APPROVAL SYSTEM

[75] Inventor: Carl A. Adams, San Francisco, Calif.

[73] Assignee: Visa International Service Association, San Mateo, Calif.

[21] Appl. No.: 611,933

[22] Filed: Nov. 9, 1990

[51] Int. Cl.⁵ ............................................. G06F 15/21
[52] U.S. Cl. .................................. 235/379; 235/380; 340/825.33
[58] Field of Search ............................ 235/379, 380; 340/825.34, 825.33

[56] References Cited

U.S. PATENT DOCUMENTS

| | | | |
|---|---|---|---|
| 3,696,335 | 10/1972 | Lemelson | 340/149 A |
| 4,485,300 | 11/1984 | Peirce | 235/379 |
| 4,558,211 | 12/1985 | Berstein | 235/380 |
| 4,795,890 | 1/1989 | Goldman | 235/380 |
| 4,812,628 | 3/1989 | Boston et al. | 235/380 |
| 4,874,932 | 10/1989 | Kimizu | 235/379 |
| 4,891,503 | 1/1990 | Jewell | 235/380 |
| 4,943,707 | 7/1990 | Boggan | 235/380 |

Primary Examiner—John W. Shepperd
Attorney, Agent, or Firm—John P. Sutton

[57] ABSTRACT

A transaction approval system (10) is disclosed which includes various enhancements to existing systems. For example, the transaction limit (30) stored in the terminal can by dynamically adjusted to vary the level of risk at the terminal to be closer to the desired level of risk. The terminal will also generate and store a list of account numbers (44,46) which might be invalid and should provode an on-line request for authorization.

13 Claims, 2 Drawing Sheets

TRANSACTION APPROVAL SYSTEM

TECHNICAL FIELD

The subject invention relates to a system for authorizing financial transactions based on the use of transaction cards. Various enhancements to the operation of a transaction terminal are disclosed which can improve the operation of existing systems.

BACKGROUND OF THE INVENTION

A large percentage of transactions are now completed using a transaction card, rather than cash or checks. A small, but significant percentage of all such transactions generate losses due to improper usage of the cards. Such improper usage can include exceeding the credit limit of the card. The definition of improper use also includes continued purchases while failing to pay monthly minimum charges. Various fraud scenarios also contribute to this loss. For example, purchases are made with cards that have been lost or stolen. In addition, dishonest employees at a merchant can improperly create a transaction through the unauthorized use of an account number.

Many approaches have been implemented to reduce these losses. One of the earliest approaches used to combat these losses was to distribute a printed list of invalid cards. In use, the merchant would check the account number on the card presented for the transaction with the account numbers printed in the list. If the account number is listed, the transaction would be declined.

The use of such a printed list is effective in reducing a large percentage of fraud losses. Unfortunately, this approach has a few drawbacks. For example, a transaction card is often used almost immediately after it has been lost or stolen. This immediate use will occur before the card has been listed or before the list has been distributed.

Because of these difficulties, other, more sophisticated techniques have been implemented. One of the most effective schemes is to authorize every transaction through a real-time, on-line communication network. For example, an automated transaction terminal at the merchant can transmit the account number of the card presented for a transaction to a central processor. The account number of the card can then be checked against a current list of invalid card numbers stored either at the central processor or back at the card issuer.

This on-line scheme eliminates the lag time inherent in distributing printed lists of invalid cards. Furthermore, the cost of authorizing transactions is justified for high value transactions. However, for low value transactions, the losses tend to be lower and the benefits gained from on-line authorization do not justify the added costs and delay involved in obtained an on-line approval.

Accordingly, various approaches have been developed to authorize lower value transactions at the terminal, in an off-line manner. The simplest approach has been to provide the terminal with a transaction or "floor" limit. Any transaction having a value which is below that floor limit can be approved by the terminal. If the value of the transaction exceeds that floor limit, a request for authorization must be generated and transmitted to the central processor.

The floor limit selected for a particular terminal has traditionally been based on the type of merchant establishment and its location. The floor limit selected represents an attempt to balance the level of loss which will occur for transactions that are authorized by the terminal with the cost of transmitting the requests to the central processor.

In most systems, the issuer of the card has no control over the floor limit. More recently, a system has been developed wherein both the issuer and the financial institution that supplies the terminal to the merchant have a say as to the floor limit in the terminal. Such a system is described in U.S. Pat. No. 4,943,707, issued Mar. 14, 1989, to Boston and incorporated herein by reference. In this system, the terminal determines the transaction limit using data both stored in the terminal and data encoded on the transaction card. In the latter system, the data in the terminal used to calculate the transaction limit is also determined by the type and location of the merchant. This information is fixed in the terminal. While this approach successfully reduces some fraud losses, it cannot accommodate short term changes in the patterns of loss which occur at a specific terminal. For example, if a new employee is dishonest or follows sloppy procedures, the losses will immediately increase. Accordingly, it would be desirable to actively update the transaction limit in the terminal to maintain the desired balance between the level of risk and communication costs.

Another approach for reducing losses when a terminal authorizes transactions in an off-line mode is to provide the terminal with a list of invalid account numbers. Such a system was disclosed in U.S. Pat. No. 3,696,335, issued Oct. 3, 1972 to Lemelson. The latter approach required that the entire list of invalid cards be transmitted to the terminals. This approach has been found to be impractical because the list is quite long and therefore requires large data storage capacity in the terminals. The list would also take a long time to transmit to the terminals.

Various suggestions have been made to overcome these problems. For example, U.S. Pat. No. 4,558,211, issued Dec. 10, 1985 to Berstein teaches that the list can be reduced by geographical criteria.

Still another approach which has been suggested is disclosed in U.S. Pat. No. 4,943,707, issued Jul. 24, 1990 to Boggan, and incorporated herein by reference. In this patent, a system is disclosed for generating a data compressed version of the invalid card list. This data compressed version is much shorter and therefore requires less storage space in the terminal and can be transmitted faster. However, in certain cases, the cost of this approach still exceeds the benefits gained in reduction of loss. Accordingly, it would be desirable to provide other techniques for storing lists of potentially invalid cards which is not subject to any of the drawbacks discussed above.

Therefore, it is an object of the subject invention to provide an improved transaction approval system.

It is another object of the subject invention to provide a transaction terminal with enhancements for improving the effectiveness of the authorization process.

It is a further object of the subject invention to provide a transaction approval system wherein the transaction limit in the terminal can be varied.

It is still another object of the subject invention to provide a transaction approval system wherein the transaction limit in the terminal can be adjusted to reflect a desired level of risk of loss.

It is still a further object of the subject invention to provide a terminal which keeps a record of account numbers of certain transaction cards which were used in the terminal.

It is still another object of the subject invention to provide a terminal which keeps a local record of the account number of transaction cards in any transaction wherein the central processor declined to approve the transaction.

It is still a further object of the subject invention to provide a terminal which keeps a local record of the account number of transaction cards in any transaction where the value was below the transaction limit and the transaction was approved off-line.

SUMMARY OF THE INVENTION

In accordance with these and many other objects the subject invention includes a number of developments to enhance the effectiveness of local, off-line authorizations by transaction terminals. These enhancements are particularly effective for environments where the terminals are used to authorize a high volume of low value transactions.

One of these enhancements includes the ability to vary the transaction limit in the terminal in response to changing risk conditions at that terminal. As noted above, if a transaction amount is below the transaction limit it can be approved off-line by the terminal. In the subject technique, the records of all transactions are transmitted to a central processor. The central processor evaluates all of these transactions to determine the level of risk of loss associated with these transactions. This evaluation will include a comparison of account numbers used in the transaction with a complete list of invalid account numbers.

If the calculated level of risk is different from the desired level of risk, the transaction limit will be reset to a new value selected to adjust the level of risk to be closer to the desired level of risk. In the preferred embodiment, both long term and short term transaction histories are monitored.

In another aspect of the subject invention, a certain amount of memory in the terminal can be devoted to storing account numbers which will provoke a request for on-line authorization information. The account numbers are stored in three different lists. The first list is generated by the central processor and transmitted to the terminal. This list includes specific invalid account numbers. This list can be a data compressed version of an invalid card list described above with respect to U.S. Pat. No. 4,943,707. In the preferred embodiment, the list is very short and includes only those invalid cards which had been reported actually used in the narrow geographical region where the terminal is located.

The second and third lists are generated locally at the terminal and are based on activity at that terminal. The second list includes a record of account numbers from transactions that were forwarded to the central processor for authorization information and the central processor declined the transaction. Since this card is identified as at least suspicious, any subsequent uses should provoke an on-line request even if the transaction amount is below the transaction limit of the terminal. By placing the card on the second list, such an on-line request will be generated.

The third list contains account numbers of cards for transactions where the transaction amount was below the transaction limit and was approved, off-line by the terminal. Once the account number is placed on this list, any subsequent uses of the card at that terminal will provoke an on-line request. This technique is intended to frustrate the fraud scenario wherein the card is repeatedly used for many low value transactions in an effort to avoid detection.

It should be noted that the concept of adding account numbers to a terminal to provoke an on-line request for authorization during a subsequent use is disclosed in the above cited U.S. Pat. No. 4,943,707. However, in the system described in the latter patent, the account number was always added to the list if it had not been present in the list previously, regardless of wherein the transaction was approved off-line. Thus, even if the transaction was forwarded for on-line authorization because, for example, the transaction amount exceeded the transaction limit, the account number was still added to the list. It is believed that the latter approach is not as efficient as that described herein where the account number is added to the list only if the transaction is approved off-line by the terminal.

Further objects and advantages of the subject invention will become apparent from the following detailed description taken in conjunction with the following drawings in which:

DETAILED DESCRIPTION OF THE PREFERRED EMBODIMENT

Figure 1:
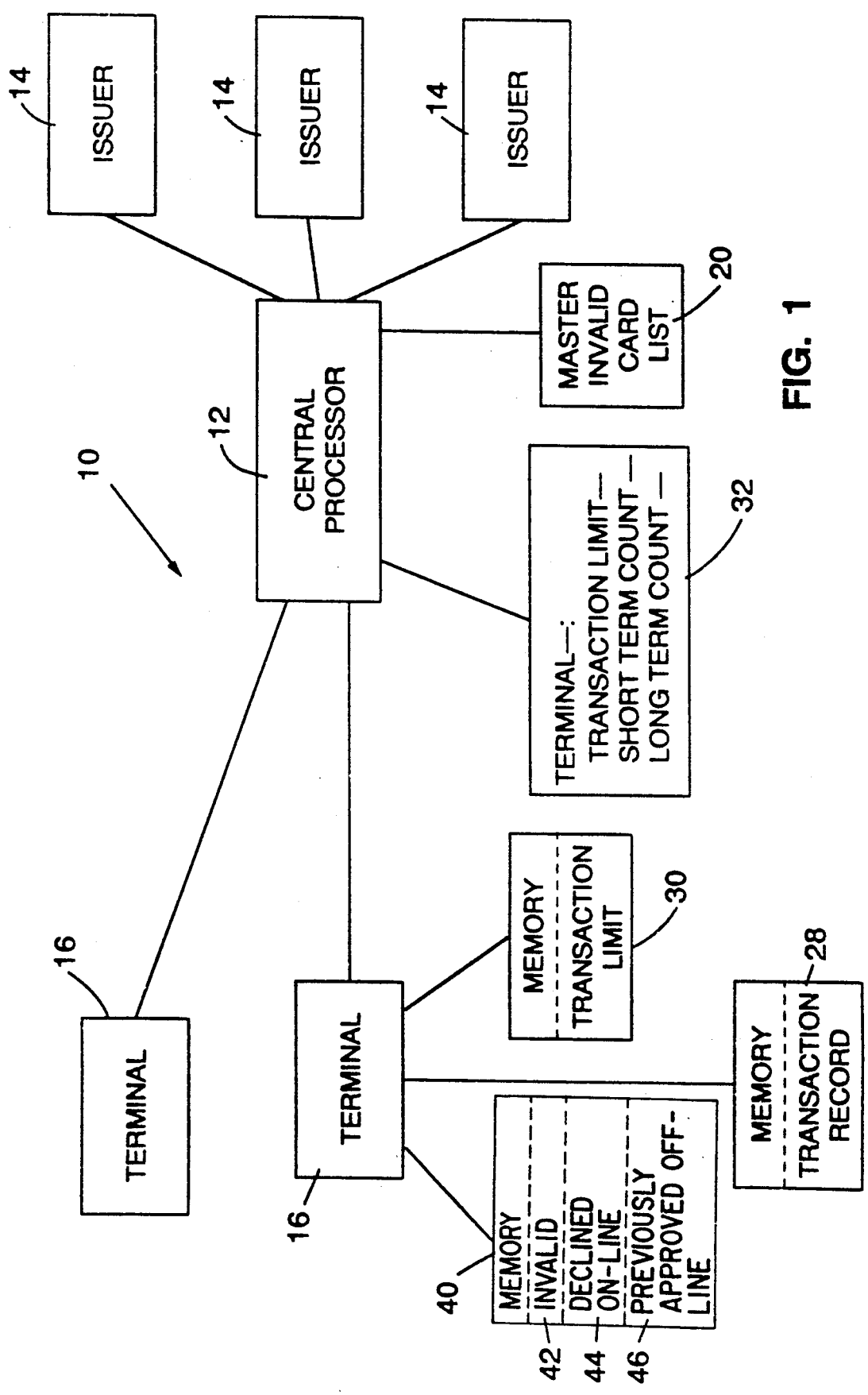
FIG. 1 is a block diagram of a transaction approval network of the subject invention.

Referring to FIG. 1, there is illustrated an overall block diagram of a transaction approval network 10. The network 10 includes a central processor 12 which functions as communication node between financial institutions that issue transaction cards (issuers 14) and terminals 16. As shown in FIG. 1, the terminals 16 can be directly connected to the central processor 12. In large transaction systems, there exists intermediate financial institutions and processors which act as intermediate communication nodes. For the purposes of describing the subject invention, the intermediate communication nodes can be considered transparent to the system.

In existing systems, the central processor can route requests for authorization information generated at a terminal 16 to the issuer 14 of the transaction card. The issuer will determine if a particular transaction can be approved. An appropriate response is generated by the issuer and transmitted back to the terminal.

If the issuer is unavailable, the central processor will act on the authorization request. To facilitate the evaluation of the transaction, the central processor maintains a list 20 of invalid cards, generated from information supplied by the issuers. The central processor consults that list in determining whether a particular transaction can be approved.

As noted above, many existing transaction terminals are equipped to authorize a certain percentage of transactions in an off-line manner, without contacting the central processor. These existing terminals includes internal processors and electronic memories. The design of such terminals is well known to those skilled in the art and need not be discussed. The subject invention can be implemented in latter type of terminals with the modifications discussed below.

In order to authorize the transaction locally, an existing terminal will carry out a number of tests. For example, the terminal will determine if the card has expired by comparing the expiration date to the current date. The terminal can also determine if the account number is in an allowable format so that forged cards can be identified.

The terminal will also determine if the transaction amount is below an internally set transaction limit. If the transaction amount exceeds the transaction limit, a request for authorization information will be generated and transmitted to the central processor. The central processor will supply a response to the terminal, based on information from its own data base or based on a communication with the issuer. If the transaction amount is below the transaction limit, then the terminal can authorize the transaction.

As noted above, the transaction limit is typically fixed in the terminal. It is selected to control the risk of loss at a desired level. Terminals which are in locations which are subject to high loss will have a low transaction limit. If losses are very high, the transaction limit could even be set to zero to insure that all transactions are sent on-line for authorization. In contrast, terminals which are located at merchants where losses are low can have a high transaction limit, such as $50 or more.

As noted above, the loss associated with low value transactions is not high. It has been determined that the average additional loss which can be expected when a twenty dollar purchase is not authorized in an on-line manner amounts to about four cents. In contrast, it costs about ten cents to obtain an on-line authorization. Thus, as long as the rate of risk of additional loss is maintained at a low level, it will be more cost effective to authorize low value transactions off-line. This goal can be achieved by dynamically adjusting the transaction limit in the terminal. The subject approach has the added benefit that off-line approvals are much faster and therefore highly desirable in high volume, low value environments.

As noted above, in the prior art systems, the transaction limit was selected and stored in the terminal based on past performance by the merchant and the location of merchant. It is believed that at least one system exists where the transaction limit can be downloaded to the terminal from a central source. However, even in the latter system, the criteria for selecting the transaction limit is only based on regional statistics. No effort is made to analyze the performance of specific terminals. Accordingly, no prior art system could respond to a change in the level of risk at a particular terminal. Such a change could result from the hiring of a dishonest employee.

In accordance with one aspect of the subject invention, the transaction limit in the terminal can be dynamically varied to maintain the desired balance between the level of risk and communication costs. In order to carry out this goal, the central processor must assess the transaction history at the terminal on a regular basis and compute the actual level of risk associated with those transactions.

There presently exists transaction terminals which keep a record of all transactions. These terminals are referred to as data capture terminals. The transaction records are collected in a memory 28 and typically downloaded to the central processor, once a day, in a batch process. This information is used by the central processor to generate billing information which is then supplied to the respective issuers. The card issuers will then generate the bills that will be sent to the cardholder.

As can be seen, a mechanism already exists for communicating the transaction records to the central processor. In order to implement the subject invention, the central processor will now determine the number of transactions which have occurred at that terminal that are based on accounts in the master invalid card list 20. While debts created during many of these transactions will be ultimately collected, the likelihood that the debt will be uncollectible is quite high. If the level of risk posed by these recorded transactions differs from the desired level, the central processor can calculate a new transaction limit intended to adjust the level of risk to be closer to the desired level. This new transaction limit is then downloaded to the terminal and is stored in memory 30. The downloading process can be carried out during the existing data capture communication sessions.

In the preferred embodiment, the central processor will store in memory 32, a record of the existing transaction limit for each terminal. The memory will also keep a record of both the long and short term history of the risk level at the terminal. For example, the processor will keep a count of the number of transactions at the terminal and the number of improper card usages. The short term count will keep a rolling total for several days, while the long term count will cover several weeks. Both of these records are updated each time data is received from the terminal.

The analysis will be performed on all transactions, even those that were authorized on-line. In this manner, the system can detect an improper transaction that might have been approved on-line. The latter situation can occur if the transaction took place before a card was reported lost or stolen but was subsequently reported prior to the analysis by the central processor.

The calculation process by the central processor will be based on a table of decision rules. If both the long and short term risk level are below a threshold, the transaction limit could be increased. If either or both the long and short term risk level are above a threshold, the transaction limit can be adjusted downwardly. If it is determined that a new limit is necessary, that information can be downloaded to the terminal and recorded at the central processor during the next data capture session.

In order to minimizes losses for transactions that have a value below the transaction limit, it is desirable to add procedures that will provoke a request for on-line authorization in situations where there is a heightened possibility that the transaction is fraudulent. One method that has been suggested is to generate an on-line request for authorization when the value of the transaction falls in a small range just under the transaction limit. This approach can be used to prevent someone who has knowledge of the transaction limit from avoiding detection by restricting the value of purchases to amounts slightly less than the transaction limit.

Another approach is to provide the terminal with a list of invalid cards. Various methods have been developed to carry out this approach as disclosed in the above cited patents. Most of these approaches require a large amount of memory in the terminal. In addition, transmission of such lists takes a significant amount time. In the subject system, an attempt is made to derive similar benefits while reducing the memory storage and communication requirements.

In the preferred embodiment of the subject system, the terminal is further provided with a memory area 40 for storing lists of suspect cards. The account number of each card presented for the transaction is compared to the account numbers in these lists. If the account number is present, the terminal will generate a request for authorization information from the central processor.

Memory area 40 is subdivided into three lists. The first list 42 is generated by the central processor 12 and supplied to the terminal 16. This list contains invalid account numbers and could be in the form described in U.S. Pat. No. 4,943,707. However, the data compressed master table described in the latter patent might hold information about 100,000 invalid accounts and require 125 kilobytes of memory. In the subject system, it is desirable that the entire memory 40 be only about 5 kilobytes in length. Various data compression algorithms can be used to maximize the storage capability of this memory space.

In the preferred embodiment of the subject invention, the list generated by the central processor should be limited to a small subset of invalid cards that have been reported actually used in the narrow geographical area where the terminal is located. In addition, this list can be limited to cards that have been used in these type of terminals, which, as noted above, will most likely be placed in high volume, low value environments. As noted above, the subject invention includes a mechanism for daily reporting all of transaction activity from data capture terminals to the central processor. Thus, the central processor can compare the transaction records with its list of invalid cards and accurately compile a list of fraudulent cards that were used in a given region.

Since the regional list compiled by the central processor is limited to cards actually used it will be relatively small and can be transmitted quickly. Transmission time is further reduced by only transmitting new account numbers that appear on the list. These entries can be added to the list 42 in the terminal. When the region in memory storing the list is full, the oldest entry in terms of time can be deleted to make room for the most recent entry. Preferably, the parameters of the system are arranged such that any entry will remain resident in the terminal an average of about three weeks.

The remaining two regions in memory 40 include lists which are generated by and remain in the terminal. List 44 contains a list of accounts numbers which are associated with a transaction that provoked an on-line request for authorization information and the response from the central processor was to decline the transaction. In this case, the account number is clearly suspect and any future use of the card should be scrutinized. By placing the account number on this list, an on-line request will be generated for each subsequent use of the account number even if the transaction amount is below the transaction limit. As with the first list 42, when the memory space is full, the oldest entry can be deleted to make room for the most current entry.

The third list 46 contains account numbers of all cards which have been involved in transactions that have been approved off-line. By this approach, the second use of the card at that terminal will provoke an on-line request for authorization information. The system will therefore allow a single fraudulent use below the transaction limit but will stop a second use. It has been found that a common fraudulent activity pattern includes multiple low value transactions at a single terminal. Recording account numbers associated with transactions that have been approved off-line will prevent such a fraud scenario. Once again, when the list is full, the oldest entry can be deleted to make room for the most current entry.

While multiple uses of a card at a single terminal for low value transactions is often associated with fraudulent activity, it is also quite common and legitimate in certain merchant situation. For example, a number of "fast food" restaurants are beginning to accept transaction cards for payment. It is not unusual for a customer to purchase food more than once a week from such a local establishment.

In order to reduce the number of times such additional low value transactions provoke an unnecessary on-line request for authorization, each account number in file 46 can further be provided with a data field indicating either the number of times it has been used or the date it was last used. If the data field is a usage counter, the requests for on-line authorization can be made only during the second usage or for every other usage. If the data field indicates the date it was last used, an on-line request can be generated only if the last use was relatively recently.

It should be understood that each terminal 16 can be provided with its own individual storage area 40. Alternatively, a single storage area 40 may be shared by a group of terminals at a given merchant location.

Figure 2:
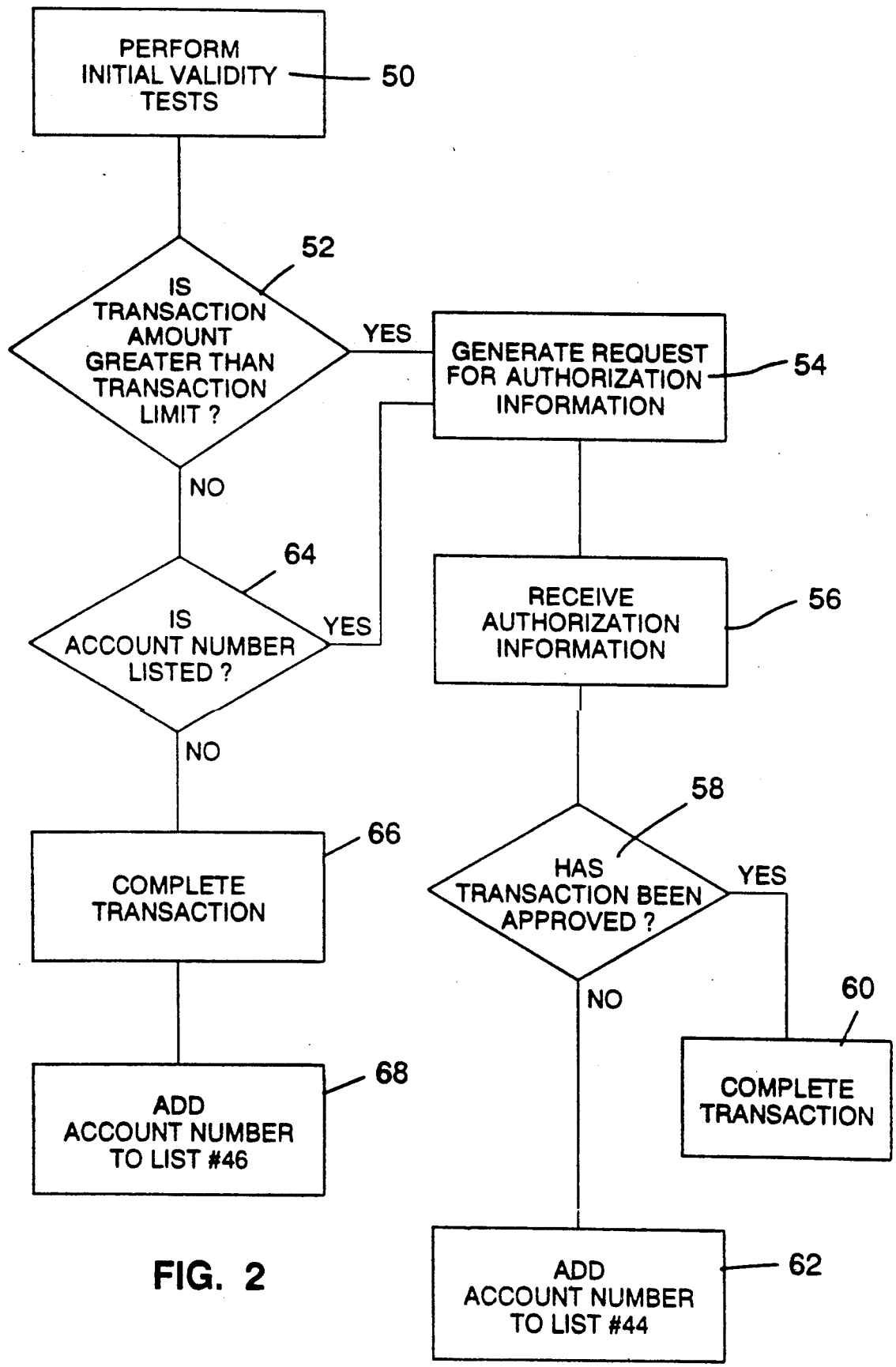
FIG. 2 is a flow chart illustrating the steps performed during a transaction in a terminal operating in accordance with the subject invention.

FIG. 2 is a flow chart illustrating the steps taken at a terminal 16 to authorize a transaction. At the start of the transaction, the card is swiped through the terminal so that identifying information encoded on the magnetic stripe of the card can be read by the terminal. The merchant will also enter the amount of the transaction.

In step 50, the terminal will carry out a number of initial tests to determine if the transaction can be approved. As noted above, these tests will include a determination as to whether the card has expired. Assuming the initial hurdles are cleared, the terminal will compare the transaction amount to the transaction limit stored in memory 30 (step 52). In the preferred embodiment, the transaction limit is dynamically adjusted on a regular basis by the central processor to maintain the level of risk close to the desired level.

If the transaction amount exceeds the transaction limit, the terminal will generate and transmit a request for authorization information from the central processor in step 54. As noted above, either the central processor 12 or the issuer 14 of the card will generate a response. In either case, a response will received by the terminal in step 56.

The terminal will then determine if the transaction has been approved or declined in step 58. If it has been approved, the transaction can be completed in step 60. Typically a message which authorizes a transaction will include an authorization code which is recorded on the transaction receipt.

If the transaction has been declined, the transaction will not be completed. In addition, the account number will be recorded in list 44 (step 62). By this arrangement, the next usage of that account number will provoke an on-line request for authorization even if the transaction amount is below the transaction limit.

Returning to step 52, if the transaction amount does not exceed the transaction limit, then the terminal must determine if the account number is present on any of the lists stored in memory 40 (step 64). If the account number is present, the terminal will generate a request for on-line authorization in step 54. The terminal will then follow the sequence described above.

If the account number did not appear on any of the lists in memory 40, then the transaction can be completed and approved off-line in step 66. In this case, the terminal will generate an authorization code which is recorded on the transaction receipt. In accordance with the subject invention, since the transaction has been approved off-line, the account number will also be added to list 46 so that a subsequent use of the card will provoke an on-line request for authorization information (step 68). As noted above, the terminal will keep a record of all transactions, whether they were authorized or declined.

In summary there has been disclosed a transaction approval system which includes various enhancements to existing systems. In one aspect of the subject invention, the transaction limit stored in the terminal can be dynamically adjusted to vary the level of risk at the terminal to be closer to the desired level of risk. In another aspect of the subject invention, the terminal will generate and store a list of account numbers which might be invalid and should provoke an on-line request for authorization.

While the subject invention has been described with reference to a preferred embodiment, various changes and modifications could be made therein, by one skilled in the art, without varying from the scope and spirit of the subject invention as defined by the appended claims.

I claim:

1. A system for authorizing transactions comprising:
    terminal means including a storage means, said terminal means functioning to authorize certain of said transactions based on criteria maintained in said storage means, said criteria including a transaction limit which is compared to the transaction amount by said terminal means, and said storage means further maintaining a record of the transactions handled by said terminal means;
    means associated with said terminal means for periodically transmitting and receiving information including said transaction records; and
    central processor means located remote from said terminal means for receiving and analyzing said transaction records and calculating a level of risk associated with said transaction records, said level of risk calculated over two time intervals of differing length to determine if the transaction limit should be changed; and
    if said level of risk varies from a desired level of risk, supplying said terminal means with different criteria based on a new transaction limit for authorizing transactions, said different criteria being selected to adjust the level of risk to be closer to the desired level of risk.

2. A system as recited in claim 1 wherein said level of risk is calculated by comparing the transaction records with information about accounts associated with the transactions.

3. A transaction terminal for use in an network for authorizing transactions based on the use of transactions cards, each transaction card having an account number, said network including a central processor, said transaction terminal comprising:
    storage means, said storage means including criteria for authorizing transactions and a list of account numbers of transaction cards; and
    processor means functioning to authorize certain of said transactions based on said criteria, said criteria including a comparison of the account number of the card presented for the transaction to said list of stored account numbers, said processor means further functioning to request authorization information from the central processor for the remaining transactions which have not been authorized by the processor means, and if any such request for authorization is declined by the central processor, said processor means further functions to add the account number of the transaction card presented for that transaction to said list in said storage means so that a subsequent use of that transaction card at the terminal will result in a request for authorization information from the central processor even if the remainder of said criteria are met.

4. A transaction terminal as recited in claim 3 wherein said criteria for authorizing the transaction further includes a transaction limit which is compared to the transaction amount by said processor means.

5. A transaction terminal as recited in claim 3 wherein the maximum number of cards which can exist in the list is fixed and when that limit is reached, the earliest temporal entry to that list is deleted to provide room for the most current temporal entry.

6. A transaction terminal for use in an network for authorizing transactions based on the use of transactions cards, each transaction card having an account number, said network including a central processor, said transaction terminal comprising:
    storage means for maintaining a transaction limit and a list of account numbers of transaction cards; and
    processor means functioning to authorize certain of said transactions by comparing the account number of the card presented for the transaction to said list of stored account numbers as well as comparing the amount of the transaction to the transaction limit, said processor means further functioning to request authorization information from the central processor for the remaining transactions which have not been authorized by the processor means, said processor means further functioning to add the account number of the transaction card presented for that transaction to said list in said storage means only if said processor means authorized said transaction, so that a subsequent use of that transaction card at that terminal will result in a request for authorization information from said central processor even if the remainder of said criteria are met.

7. A transaction terminal as recited in claim 6 wherein the maximum number of cards which can exist in the list is fixed and when that limit is reached, the earliest temporal entry to that list is deleted to provide room for the most current temporal entry.

8. A method for adjusting the transaction limit in terminal, comprising the steps of:
    analyzing the records of transactions which have occurred at the terminal to determine a level of risk associated therewith, said level of risk calculated over two time intervals of different length; and
    if said level of risk varies from a desired level of risk, changing the transaction limit in the terminal to adjust the level of risk to be closer to the desired level of risk.

9. A method as recited in claim 8 wherein the level of risk is calculated by comparing the transaction records with information about accounts associated with the transactions.

10. A method as recited in claim 8 further including the step of transmitting the transactions records to a central processor for analysis.

11. A method as recited in claim 10 wherein the central processor transmits a new transaction limit to the terminal.

12. A method of operating a transaction terminal for use in an network for authorizing transactions based on the use of transactions cards, each transaction card having an account number, said network including a central processor, and wherein a list of account numbers of transaction cards are stored in the terminal along with criteria for approving a transaction, said criteria including a comparison of the account number of the card presented for the transaction to the list of stored account numbers, said method comprising the steps of:

requesting authorization information from the central processor for transactions which do not meet the stored criteria, and if any such request for authorization is declined by the central processor;

adding the account number of the transaction card presented for that transaction to the list in the terminal so that a subsequent use of that transaction card at the terminal will result in a request for authorization information from the central processor even if the remainder of said criteria are met.

13. A method as recited in claim 12 wherein the criteria for authorizing the transaction further includes a transaction limit which is compared to the transaction amount by the terminal.

* * * * *